United States Patent [19]
Badami et al.

[11] Patent Number: 5,433,079
[45] Date of Patent: Jul. 18, 1995

[54] AUTOMATED STEAM TURBINE STARTUP METHOD AND APPARATUS THEREFOR

[75] Inventors: Vivek V. Badami; Kenneth H.-C. Chiang; Paul K. Houpt; James B. Comly, all of Schenectady; Bernd A. K. Westphal, Clifton Park, all of N.Y.

[73] Assignee: General Electric Company, Schenectady, N.Y.

[21] Appl. No.: 208,151

[22] Filed: Mar. 8, 1994

[51] Int. Cl.$^6$ .............................................. F01K 13/02
[52] U.S. Cl. ......................................... 60/660; 60/646
[58] Field of Search ................................... 60/646, 660

[56] References Cited
U.S. PATENT DOCUMENTS

| | | | |
|---|---|---|---|
| 4,121,424 | 10/1978 | Sato et al. | 60/660 |
| 4,868,754 | 9/1989 | Matsumoto | 60/646 |
| 4,910,684 | 3/1990 | Ostergaard et al. | 364/503 |
| 5,046,318 | 9/1991 | Hwang et al. | 60/646 |
| 5,205,979 | 4/1993 | Matsuyama et al. | 266/80 |
| 5,206,566 | 4/1993 | Yoshida et al. | 318/568.22 |

OTHER PUBLICATIONS

Copies of slides presented at the Electric Power Research Institute meeting on Apr. 1, 1993.

Zadeh, Lofti A., "Making Computers Think Like People," IEEE Spectrum, Aug. 1984, pp. 26–32.

Aoyagi, K. et al., "An Expert System for Startup Scheduling and Operation Support in Fossil Power Plants".

Primary Examiner—Ira S. Lazarus
Assistant Examiner—L. Heyman
Attorney, Agent, or Firm—Donald S. Ingraham; Marvin Snyder

[57] ABSTRACT

A method for automated control of a steam turbine prewarming procedure employs fuzzy logic to generate a control signal for a turbine regulatory function, such as steam supply. The method includes the steps of determining a plurality of turbine condition parameter signals; generating a plurality of regulatory control directions; generating a weighting factor to be assigned to each of said regulatory control directions by means of a fuzzy inference calculation in accordance with an operator-selected fuzzy logic profile, and applying the weighting factors to the regulatory control directions to produce the turbine regulatory function control signal. The turbine regulatory function control signal is applied to a respective function controller in the steam plant such that the selected turbine prewarming profile is implemented.

27 Claims, 3 Drawing Sheets

FUZZY LOGIC MODE SELECTION RULES

| INPUT | | | OUTPUT | | | |
|---|---|---|---|---|---|---|
| OPERATOR INPUT "RATE" | SPEED ERROR | STRESS ERROR | SPEED WEIGHT | STRESS WEIGHT | TEMP. WEIGHT | COND. WEIGHT |
| SLOW | ZERO | ZERO | MED | LOW | LOW | HIGH |
| SLOW | ZERO | HIGH | MED | HIGH | LOW | HIGH |
| SLOW | HIGH | ZERO | HIGH | LOW | LOW | MED |
| SLOW | HIGH | HIGH | HIGH | HIGH | LOW | MED |
| FAST | ZERO | ZERO | LOW | LOW | HIGH | MED |
| FAST | ZERO | HIGH | LOW | MED | MED | MED |
| FAST | HIGH | ZERO | MED | LOW | MED | LOW |
| FAST | HIGH | HIGH | MED | MED | MED | LOW | fig. 3

AUTOMATED STEAM TURBINE STARTUP METHOD AND APPARATUS THEREFOR

BACKGROUND OF THE INVENTION

Steam turbines are commonly used to drive electrical generators in power plants. A typical steam turbine is a massive yet intricate piece of machinery that must be started up in a controlled manner in order to protect the many turbine components from damage from stresses and distortion that would result from immediate exposure to high temperature and pressure steam. One part of the turbine startup process is the prewarming procedure, which includes the steps of steam chest warming and turbine rotor prewarming. The chest warming procedure warms the control valve steam distribution chest to the stop valves; this step is accomplished before the control valves are opened during turbine acceleration and loading. The goal of the rotor prewarming process is to raise rotor bore temperatures without exceeding allowable rotor stress limits; rotor stress is controlled by bringing temperatures of critical rotor locations to specified values before the turbine is accelerated to its nominal operating speed.

When a steam turbine is being started up from a cold-shutdown condition, necessary auxiliary systems (such as lubrication oil, auxiliary steam systems, and the like) are placed in service. The turbine is placed on a turning gear, which keeps the turbine spinning slowly (e.g., 2-3 rpm) during the prewarming procedure. The steam chest of the turbine must be warmed in a manner such that differential temperatures between inner and outer walls of the steam chest do not cause excessive stress in the metal and such that the turbine steam control valve(s) are warmed prior to the unit being exposed to nominal steam system pressures and temperatures.

In prewarming the rotating components of the turbine, small amounts of steam are admitted to the high pressure side of the turbine to cause the turbine rotor to warm up, both through direct exposure to the steam and conduction of heat through turbine components, such as the rotor shaft. During the heating process, condensate from the steam admitted to the turbine must be drained off to avoid buildup of liquid in the turbine housing to prevent the turbine buckets from passing through water thereby causing cavitation damage. This procedure is continued until specified temperatures are reached on key turbine components and the steam pressure in the turbine reaches a selected level, at which time the turbine is ready to be accelerated and loaded.

It is desirable from an operational standpoint to complete the prewarming procedure in the shortest time consistent with turbine limitations such as allowable rotor stress. The prewarming procedure is typically accomplished by operators manually checking various indications of critical turbine parameters, such as rotor temperatures and stresses, and then implementing actions (such as opening or closing the steam supply valve) to increase or decrease, as appropriate, the rate of the turbine warm-up. There are several constraints on the rapidity with which the turbine can be warmed, however, such as the amount of steam admitted should not cause the turbine to "roll-off" the turning gear and accelerate prematurely; rotor and steam chest stress limits cannot be exceeded, and the turbine pressures and temperatures must be maintained within specified limits. In some situations, however, such as when there is an immediate need to have the turbine-generator in service, it is necessary to complete the prewarming procedure more rapidly than normal. In such circumstances, the operator must optimize the procedure by accepting some deviation from normal warm-up procedures, such as increasing the steam flow and allowing the turbine to periodically "roll off" the turning gear while ensuring that the turbine is not damaged by premature acceleration.

Efficiency and ease of operation make it advantageous to automate as many turbine operating control procedures as possible. There are, however, few good models of turbine operation at low temperatures and pressures, and thus traditional control oriented approaches to automation are not readily adapted to control the turbine prewarming procedure.

It is therefore an object of this invention to provide an automated method of prewarming a steam turbine.

A further object of this invention is to provide a turbine operation method employing fuzzy logic to generate signals to control the prewarming procedure for a steam turbine.

A still further object of this invention is to provide an automated prewarming procedure for a steam turbine that allows the operator to select a warm-up profile ranging between a slow warm-up rate and a fast warm-up rate.

SUMMARY OF THE INVENTION

In accordance with this invention, a method for automated control of a steam turbine employs fuzzy logic and includes the steps of producing a control signal for a turbine regulatory control function by means of a fuzzy inference calculation in accordance with a selected fuzzy-logic rule base and a selected turbine startup profile, and applying the control signal for a turbine regulatory control function to a respective function controller such that a selected turbine startup profile is implemented.

In particular, a method for prewarming a steam turbine includes the steps of determining turbine performance parameters such as turbine bore temperature, turbine speed, turbine bore stress, and steam line condensate level. For each turbine performance parameter, a respective regulatory control direction is generated by a respective control loop. Further, weighting factors are produced by means of a fuzzy inference calculation based on selected performance parameters, the operator-selected warm-up profile, and a fuzzy logic rule base; a weighting factor is applied to a respective one of the regulatory control directions to produce the control signal for the turbine regulatory function. The operator-selected warm-up profile comprises at least a slow warm-up profile and a fast warm-up profile for the turbine to place the turbine in condition for operation (e.g., acceleration and loading). The weighted steam plant control signal is then applied to a respective steam plant controller. Typically, the step of producing the weighted steam plant control signal includes the steps of producing a weighted steam supply valve control signal and a weighted drain valve control signal. The step of producing these weighted control signals each respectively include assigning weights to respective control directions generated by respective regulatory loop processors for turbine bore temperature, turbine speed, turbine bore stress, and condensate level.

An apparatus for automated control of a steam turbine warm-up procedure includes a turbine warm-up control circuit coupled to the steam plant to receive selected sensing signals and to drive turbine regulatory control actuators, such as a steam supply valve actuator. The turbine warm-up control circuit comprises a plurality of control loop regulators, a fuzzy logic controller, and a regulatory output weighting component. The fuzzy logic circuit comprises means for generating a plurality of weighting factors. The weighting component is coupled to receive the respective steam system regulatory directions from the control loop regulators and to receive the weighting factors from the fuzzy logic circuit so as to generate the weighted steam plant control signal.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

FIG. 3 is a table presenting an example of fuzzy logic mode selection rules used in accordance with the method of the present invention.

DETAILED DESCRIPTION OF THE INVENTION

Figure 1:
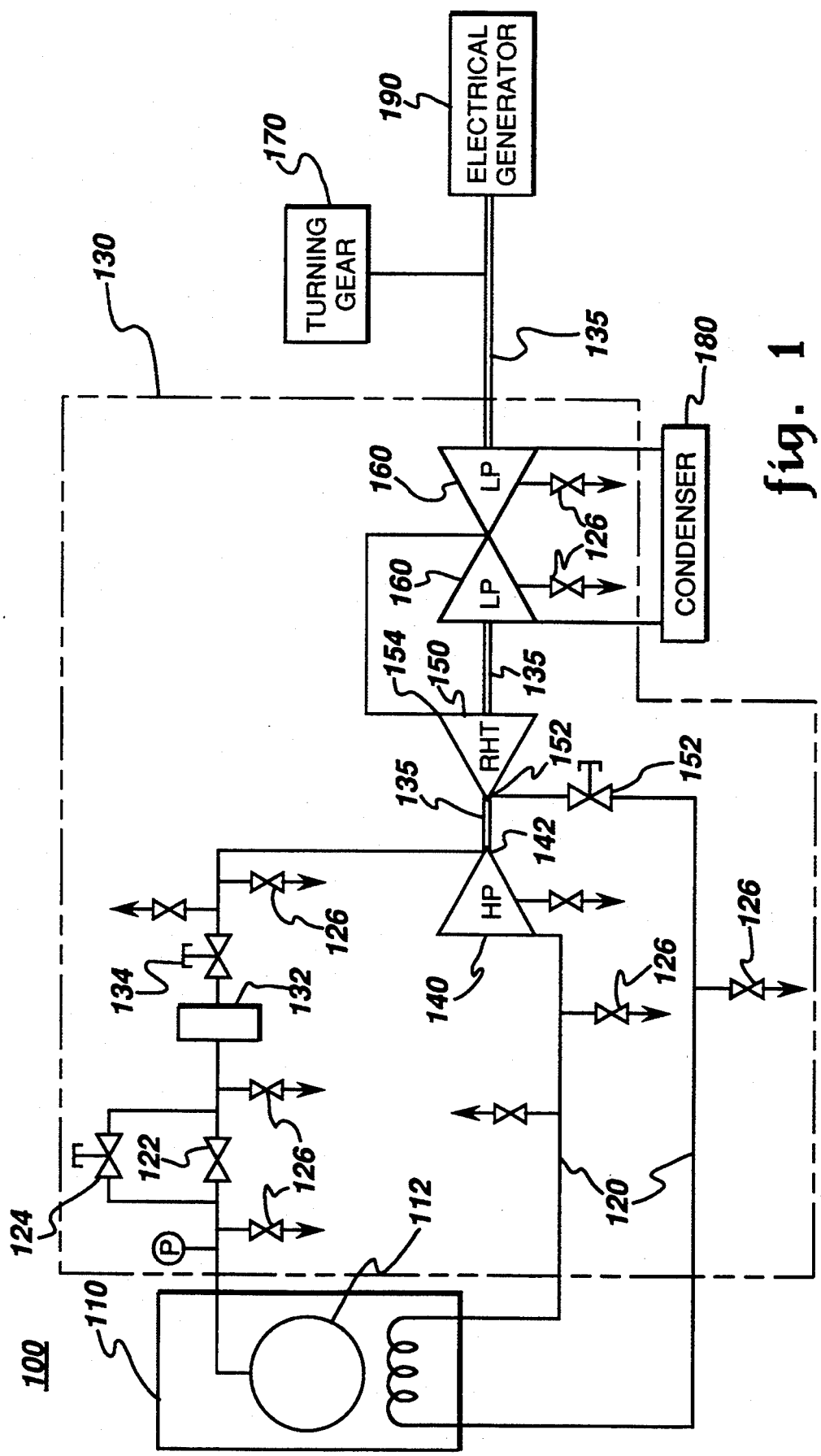
FIG. 1 is a schematic diagram of steam plant having a steam turbine that can be prewarmed in accordance with the method of the present invention.

A steam plant 100 used in the generation of electricity commonly comprises a steam generator 110 coupled via steam piping 120 to deliver steam to a steam turbine 130, which in turn is mechanically coupled to turn an electrical generator 190. Steam generator 110 typically comprises a steam drum 112 in which water is converted to steam by heat from a thermal energy source such as an oil or coal-fired boiler or a nuclear reactor. The steam passes from steam generator 110 through steam piping 120 so as to be directed to components in steam plant 100, such as turbine 130, in which energy in the steam is extracted. Steam that has passed through such steam plant components is exhausted to a condenser 180 in which the steam is condensed and the resulting water is typically fed back into the steam generator.

Steam piping 120 comprises a main stop valve 122, a main stop valve bypass valve 124, and a plurality of drain valves 126 (typically relatively small valves used to drain condensed steam out of the steam lines). Steam piping 120 is coupled to turbine 130 such that steam passing from steam generator 110 enters turbine 130 through a steam chest 132 and a control valve 134. As illustrated in FIG. 1, steam turbine 130 comprises a high pressure turbine portion 140, a reheat turbine portion 150, and a low pressure turbine portion 160; each of these turbine portions are mounted on a common turbine shaft 135. In this arrangement, high pressure turbine portion 140 is typically coupled via steam piping 120 to steam generator 110 such that steam that has passed through high pressure turbine portion 140 is piped back to steam generator 110 (where it is reheated). Reheat turbine portion 150 is coupled via steam piping 120 and combined reheat valves 151 to steam generator 110 such that reheated steam is directed into the high pressure end of reheat turbine portion 150. Reheat turbine portion 150 is further coupled to low pressure turbine portion 160 such that steam exhausting from reheat turbine portion 150 is directed into the low pressure turbines. Low pressure turbine portion 160 is coupled to condenser 180 such that steam exhausting from the low pressure turbine(s) passes into condenser 180. Common turbine shaft 135 is coupled to drive electrical generator 190.

Further, a turning gear 170 is detachably coupled through a clutch type mechanism to turbine shaft 135. The turning gear comprises a motor and associated gearing that is adapted to rotate the turbine at a slow speed, e.g., 2-3 rpm, during periods when steam is not being used to drive the turbine, such as during maintenance and start-up operations.

After a shutdown period when turbine components have cooled from their normal operating pressures, a deliberate warm-up procedure must be followed to avoid excess stress on turbine components. In particular, care must be taken to not cause stress-induced damage of the steam chest and the rotor of the turbine. For example, the critical locations to be warmed comprise a first stage rotor bore 142 of high pressure (HP) turbine 140, an inlet section 152 of reheat turbine (RHT) portion 150, and an exhaust section 154 of RHT portion 150. In the prewarming procedure the heating of the HP rotor bore is controlled by the application of steam to the turbine (typically through control of main steam bypass valve 124). The heating of reheat turbine portion 150 results from conduction along the rotor (common shaft 135) of the HP turbine and from steam drawn in from steam seals around the rotor.

The following temperatures are exemplary of minimum temperatures required prior to acceleration and loading of a large (e.g., 500 MW)turbine generator:

HP rotor bore (1st stage area)temp.:>300° F.
RHT bowl (inlet area)temp.:>130° F.
RHT exhaust area temp.:>130° F.

In the event the temperature at any of these selected locations is less than the specified minimum, the turbine must be prewarmed while it is "on turning gear." The clutch arrangement of turning gear 170 allows the turbine to "roll off" if sufficient steam is admitted to the turbine, although such "rolling off" is generally undesirable, and typically is not provided for in standard manual warm-up procedures. Some roll off is tolerated when rapid warm-up of the turbine is required, although the turbine should be brought back onto the turning gear promptly.

The turbine warm-up procedure typically has two phases. The first phase of the warm-up procedure is referred to as the condensation phase, and is normally performed manually by the turbine operator. In this phase, main steam bypass valve 124 is opened a small amount to pressurize steam chest 132 HP turbine 140, and reheat pipes 120; combined reheat valves 151 are kept closed during this phase. During the initial stages of pressurizing turbine 130, drain valves 126 must be opened frequently to remove condensate from steam pipe 120 and components of turbine 130. The amount of steam applied (controlled by the position of main steam bypass valve 124)is gradually increased as the turbine components begin to warm and less condensate is formed.

At the point that the temperature of the interior metal turbine surfaces reach the saturation temperature of the steam, pressure in the turbine begins to rise, at which point the pressurization phase of the prewarming procedure begins. Typically turbine 130 is pressurized to about 70 psig and maintained at this pressure until the desired turbine temperatures (noted above) are reached and the turbine is ready for acceleration and loading. In current practice, the operator has no automated way of specifying a warm-up profile that can consistently result in a predetermined warm-up rate.

In accordance with this invention, a method for prewarming a turbine uses fuzzy logic such that the warm-up is accomplished maintaining selected turbine specifications and in accordance with an operator-selected warm-up profile. With the use of fuzzy logic the method of the present invention provides an automated start-up procedure that optimizes the prewarming process by minimizing its duration for a given warm-up profile selected by the operator, such as a "normal" (that is, slow) warm-up or a fast warm-up (as in when there is an immediate need for use of the turbine).

Figure 2:
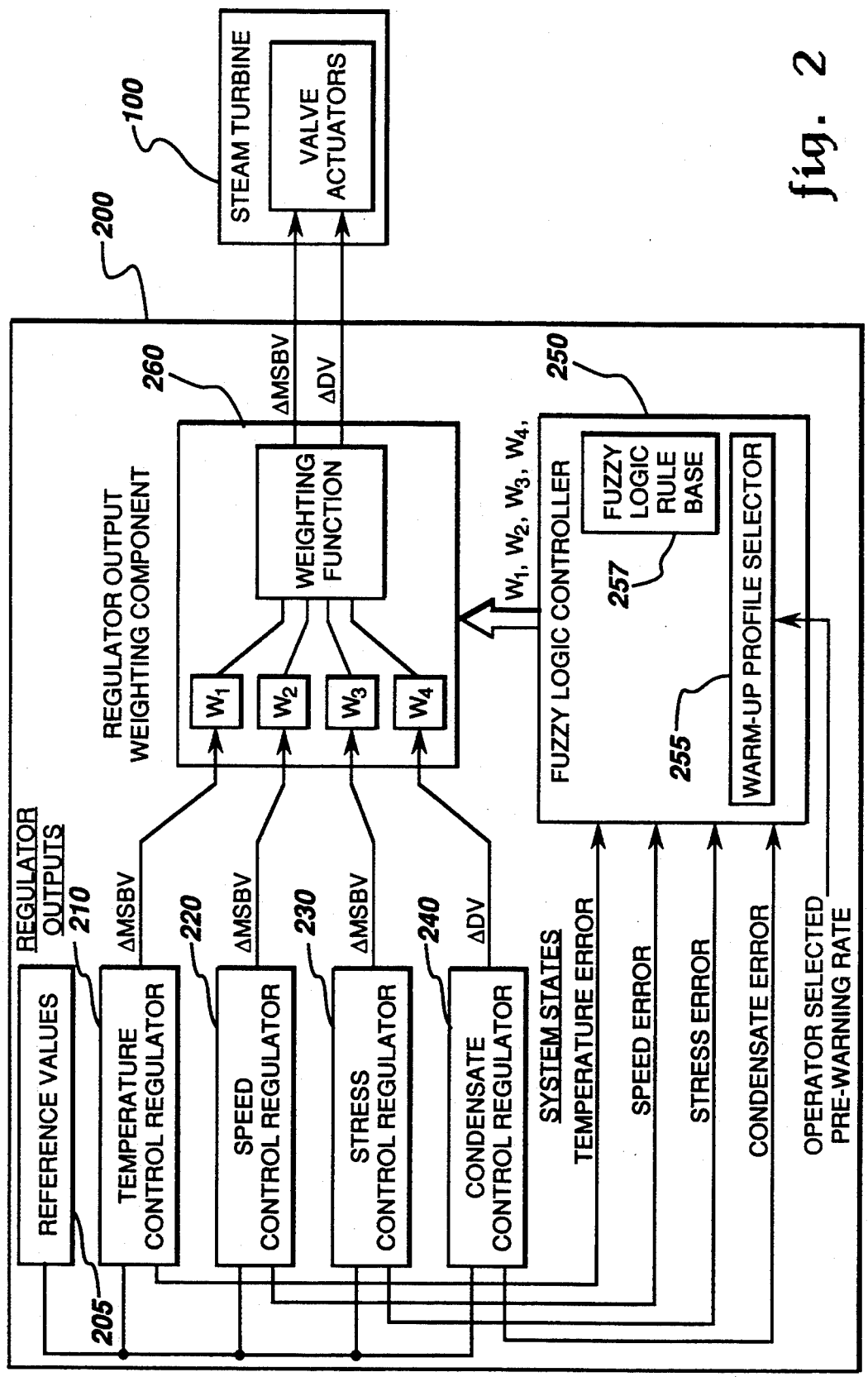
FIG. 2 is a block diagram illustrating the steam turbine prewarming control architecture used in accordance with the method of this invention.

The prewarming architecture in accordance with this invention comprises a turbine control circuit 200 (FIG. 2) which provides both regulatory control functions and supervisory control functions. Regulatory control refers to sensor-based closed loop control of various process parameters in the turbine, and the supervisory control utilizes fuzzy logic to weight the control signals generated by the regulatory control loops in order to optimize the prewarming process. Turbine control circuit 200 comprises a plurality of regulatory control loops for generating regulatory control signals for respective steam plant systems; a fuzzy logic controller 250; and a regulator output weighting component 260, which components are coupled together as described below to generate, using an operator-selected warm-up rate and fuzzy inference calculations, weighted control signals to drive components of steam system 100 to effect the desired turbine warm-up profile.

Turbine controller 200 comprises a plurality of regulatory control loops (or regulators) such as a temperature control regulator 210, a speed control regulator 220, a stress control regulator 230, and a condensate control regulator 240 (as used herein, "condensate control regulator" is used to denote control of condensation collected in the steam space of supply lines and the turbine steam spaces as opposed to condensate level in condenser 180). In the block diagram of FIG. 2, for ease of illustration, single boxes are used to denote each type of regulatory control loop discussed; for a given type of regulatory control, however, such as drain valve control or temperature control loops, the illustrated control loop may comprise multiple respective control loops, e.g., one for each drain valve. Each regulatory control loop is respectively coupled to a reference value (or set-point) data base 205 so as to receive the respective selected reference value for the parameter being controlled by the regulatory control loop. Data base 205 typically comprises an electronic memory device such as is commonly used in computers.

In the method of this invention selected turbine condition parameters are determined. For example, each regulatory control loop is coupled to sensors (not shown) in steam plant 100 to receive respective signals providing information on the actual state of the turbine for a respective parameter, such as the temperature at a selected location in the steam system, turbine speed, or the like. The sensor signal used in a particular regulatory control loop may comprise a measured value of the controlled parameter (e.g., turbine speed) or, alternatively, a calculated value of the controlled parameter based upon measured conditions in the steam turbine (e.g., rotor bore stress is determined based upon temperature measurements; condensate level is determined based upon drain valve temperature and steam system pressure measurements).

In each regulatory control loop a reference value of the respective controlled parameter (obtained from reference value data base 205) is compared with actual state of that turbine parameter and a corresponding error signal is produced. For example, in temperature control loop regulators 210 a reference temperature for a given turbine component is compared with the determined value of that parameter in the warming turbine; the reference temperature in respective temperature control loops comprise the predetermined minimum temperature for the HP bore, RHT bowl, and RHT exhaust turbine rotor areas that must be reached prior to turbine acceleration and loading. Similarly, in speed control loop regulator 220 a reference turbine speed (such as the turning gear speed) is compared with the measured actual turbine speed; in stress control loop regulator 230 the stress reference value (e.g., the turbine specification value for maximum allowable rotor bore stress) is compared to the calculated actual bore stress based upon the measured surface temperature values at selected points in the turbine; and in drain control loop regulators 240 a reference signal for allowable condensate is compared with a determined signal of condensate amount (determined for example, by use of temperature sensors in the drain valve piping) to generate a condensate error signal. Each control loop regulator is respectively coupled to fuzzy logic controller 250 to supply the respective error signals generated to the fuzzy logic controller.

Each control loop regulator typically comprises a proportional-integral algorithm controller that generates a respective regulatory control direction based upon the error signal produced through comparison of the determined turbine performance parameter with the respective reference value of that parameter. Further, each regulatory control loop generates a respective regulatory control direction (that is, a signal to direct action to achieve an effect in the steam plant). Temperature control regulators 210, for example, use the temperature error signal to generate a regulatory control direction to position the steam supply valve so as to minimize the error between the reference temperature and the determined temperature. Typically the steam supply valve controlled (via an actuator) by turbine warm-up control circuit 200 is the main steam bypass valve 124 (FIG. 1); such a drive signal is denoted in FIG. 2 with the terminology "ΔMSBV".

Speed control loop regulator 220 also generates a respective steam supply valve regulatory control direction ΔMSBV from the signal corresponding to the speed error between the measured speed of the turbine with the turning gear speed (i.e., the nominal warm-up speed). Similarly, in stress control loop regulator 230 the stress error signal is used to generate another regulatory control direction ΔMSBV for the steam supply valve. In drain valve control loop regulator 240 the condensate error signal is used to generate a regulatory control direction ΔDV for opening or closing respective drain valves.

Each control loop regulator is respectively coupled to regulator output weighting component 260 so that the respective regulatory control directions generated are supplied to weighting component 260 to be further processed as discussed below.

In accordance with this invention, fuzzy logic controller 250 provides the supervisory control function to optimize the turbine warm-up in accordance with the operator selected warm-up profile through the application of a selected fuzzy logic rule base 257. Fuzzy logic controller 250 comprises a warm-up profile selector 255 that provides for selection of a slow (or normal) warm-up profile and a fast warm-up profile; alternatively, additional (e.g., intermediate timeframes for the warm-up) can be provided for in the fuzzy logic controller. The fuzzy inference calculation generates a plurality of weighting factors "$W_n$", with "n" corresponding to the number of regulatory control directions to be weighted in regulatory output weighting component 260. For example, in FIG. 2 four weighting signals "W1" to "W4", inclusive, are represented and correspond respectively to the regulatory directions from temperature control regulator 210, speed control regulator 220, stress control regulator 230, and condensate control regulator 240.

The fuzzy inference calculation applies predetermined fuzzy inference rules from rule base 257 to generate the respective weights for the regulatory control directions generated by the control loop regulators. One example of a fuzzy logic rule base for controller 250 is set forth in FIG. 3. For this example, the rule set for the fuzzy inference calculation is determined by three inputs to fuzzy logic controller 250: the operator-selected warm-up profile can be either "slow" or "fast"; the turbine speed error is "zero" or "high"; and the turbine stress error is "zero" or "high". The various weights assigned to the respective regulatory control directions are qualitatively presented in the rule table of FIG. 3. In accordance with known practices in the field of fuzzy logic, such semantics correspond to quantitative values between 0 and 1, with the application of particular rules and the exact values applied being determined by the system designer to provide the optimal system performance (e.g., to mimic and improve upon heuristically-determined operator control actions in the plant).

Fuzzy logic controller 250 is coupled to regulatory output weighting component 260 so that the weighting factors "W1" through "W4" are supplied to component 260. Weighting component 260 comprises means for weighting the respective regulatory control direction signals from the control loop regulators by the amount of the respective weighting signal from fuzzy logic controller 250. For example, such weighting may be accomplished by electronically multiplying the respective weighting factor and regulatory direction. Further, respective regulatory control directions for control of the same steam plant parameter, such as steam supply as controlled by the main steam bypass valve position, are combined (such as by electronically summing the signals) to produce control signals for the selected turbine regulatory function. Thus, the final combined output control signal for the steam supply valve "$\Delta MSBV$" can be expressed as follows:

$$\frac{[(W1*\Delta MSBV_{temp}) + (W2*\Delta MSBV_{speed}) + (W3*\Delta MSBV_{stress})]}{(W1 + W2 + W3)]}$$

(In this example this relationship provides a combined output weighted average value that does not exceed 1, which would represent the maximum opening of the steam supply valve. Similarly, the the control signal for a respective drain valve control "$\Delta DV$" can be expressed as: $W4*\Delta DV_{cond}$ Weighting component 260 is coupled to actuators in steam plant 100 so that control signals are applied to the respective actuators in the steam plant to implement the selected warm-up profile.

For example, the fuzzy inference calculation of the rule in the first line of FIG. 3 provides that for a "slow" prewarming rate selected by the operator, zero speed error, and zero stress error, the weight assigned to all regulatory controller directions would be low except that for condensate control. The turbine would thus be warmed very slowly, with a heavy emphasis on keeping the turbine on the turning gear and reducing condensate accumulation. If the speed error and the stress error became high, however, the rule appearing in the fourth line of FIG. 3 begins to take effect and the weights of the regulatory controllers for speed and stress are increased in order to reduce the error between the determined value and the reference value for each of these parameters. In the same situation (high speed error, high stress error), if the operator-selected warm-up profile calls for a "fast" warm-up (that is, the rule of line 8 of FIG. 3 applies), the weighting assigned to speed control, stress control, temperature control, and condensate control is different than when the "slow" warm-up profile has been selected, and as a result, the turbine may periodically roll-off the turning gear.

In another embodiment of the present invention, fuzzy logic controllers can be used for one or more of the above mentioned control loop regulators in lieu of conventional numerical regulatory controllers using proportional-integral algorithms.

Thus in operation, the method of the present invention provides for determining the selected turbine performance parameters (that is, parameters selected to provide the desired control of the prewarming procedure for the turbine) and, for each of these parameters, generating a respective regulatory control direction. Weights to be assigned to respective regulatory control directions are produced by means of a fuzzy inference calculation using a fuzzy rule base and an operator-selected warm-up profile; respective weights are applied to corresponding regulatory control directions to generate weighted steam plant control signals. The weighted control signals are then applied to a respective steam system actuator (such as the actuator for the valve used to control steam supply to the turbine) so as to implement the desired warm-up profile.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A startup method for a steam turbine in a steam plant, the method employing a fuzzy logic controller to generate control signals for steam plant system actuators so as to apply steam to the turbine so as to warm up the turbine in accordance with a selected optimized warmup profile, the method comprising the steps of:

producing control signals for a selected turbine regulatory function by means of a fuzzy inference calculation in accordance with a selected fuzzy-logic rule base and a selected turbine startup profile; and applying said control signals for said selected turbine regulatory function to a respective function controller so as to govern operation of said steam plant system actuators such that said selected turbine startup profile is implemented, said steam plant system actuators comprising a steam supply valve actuator controlled by signals generated by function controller, said steam supply valve actuator controlling a supply valve disposed in said steam plant so as to admit steam to said turbine for purposes of warming the turbine:

the step of producing control signals further comprising the steps of generating a plurality of regulatory control directions for control of said turbine and generating by means of said fuzzy inference calculation a weight for at least selected ones of said regulatory control directions, said weight being applied to determine the respective control signal applied to said steam plant system actuators.

2. The method of claim 1 wherein the step of generating a plurality of control directions comprises the step of determining selected turbine condition parameter signals.

3. The method of claim 2 wherein said plurality of turbine condition parameter signals comprise a turbine speed error signal and a turbine rotor stress error signal.

4. The method of claim 2 wherein said turbine condition parameter signals are generated from a plurality of regulatory control loops.

5. The method of claim 4 wherein said plurality of regulatory control loops comprises a turbine bore temperature control loop, a turbine speed control loop, and a turbine stress control loop.

6. The method of claim 5 wherein said plurality of regulatory control loops further comprises a steam drain valve control loop.

7. The method of claim 1 wherein the step of producing control signals further comprises respectively weighting selected ones of said regulatory control directions with respective ones of said weights.

8. The method of claim 7 wherein the step of producing control signals further comprises summing respective regulatory control directions that pertain to a selected control function for said turbine.

9. The method of claim 1 wherein said selected warm-up profile comprises at least a slow warm-up rate and a fast warm-up rate.

10. A method for prewarming a turbine in a steam plant using fuzzy logic such that the warm-up is accomplished without violating selected turbine operating limits and in accordance with an operator-selected turbine warm-up profile, the method comprising the steps of:

determining selected turbine performance parameters;

generating a respective regulatory control direction for each of said selected turbine performance parameters;

producing a weighted steam plant control signal by means of a fuzzy inference calculation operating on selected ones of said respective regulatory control directions, said fuzzy inference calculation comprising processing selected determined turbine performance parameters and said operator-selected warm-up profile in accordance with a predetermined fuzzy logic rule base to generate weighting signals for respective regulatory control directions and, applying said weighted steam plant control signal to respective function controllers so as to govern operation of steam plant system actuators to control steam admission to the turbine such that said operator-selected turbine warm-up profile is implemented said steam plant comprising a steam supply valve the position of which is controlled by signals generated by one of said respective function controllers.

11. The method of claim 10 wherein the step of producing said weighted steam plant control signal further comprises the steps of producing a weighted steam supply valve control signal and a weighted drain valve control signal.

12. The method of claim 11 wherein said operator-selected warm-up profile comprises a slow turbine warm-up profile and a fast turbine warm-up profile for placing the turbine in condition for operation.

13. The method of claim 12 wherein the step of generating respective regulatory control directions comprises applying the determined selected turbine performance parameters to respective control loop regulators wherein a respective one of said determined performance parameters is compared with a reference value of said parameter so as to generate the respective regulatory control direction.

14. The method of claim 13 wherein the steps of producing a weighted steam supply valve control signal and a weighted drain valve control signal each comprise assigning weights to respective control directions generated by said control loop regulators.

15. The method of claim 14 wherein said selected turbine performance parameters comprise turbine bore temperature, turbine speed, and turbine bore stress.

16. The method of claim 15 wherein said control loop regulators comprise a turbine bore temperature control loop regulator, a turbine speed control loop regulator, and a turbine stress control loop regulator, each of said foregoing control loop regulators being configured to generate a respective steam supply valve control direction.

17. The method of claim 16 wherein said selected turbine performance parameters further comprise steam line condensate level.

18. The method of claim 17 wherein said control loop regulators further comprise at least one steam line condensate level control loop configured to generate a control direction for a respective steam line drain valve.

19. The method of claim 18 wherein the step of processing selected turbine state input signals comprises processing a turbine speed error signal and processing a turbine stress error signal.

20. The method of claim 10 further comprising applying said weighted steam plant control signal to a respective steam system actuator.

21. An apparatus for automatically controlling with fuzzy logic the prewarming of a steam turbine in a steam system, comprising:

a turbine warm-up control circuit coupled to receive signals generated by a plurality of turbine performance parameter sensors; and a steam supply actuator coupled to be driven by said turbine warm-up control circuit and disposed in said steam system so as to control the admission of steam to said turbine;

said turbine warm-up control circuit comprising:

a plurality of control loop regulators, each of said regulators being configured to compare the determined value of a selected turbine performance parameter with a reference value of said parameter and to generate a steam system regulatory direction therefrom; and a fuzzy logic controller coupled to receive signals generated by said plurality of control loop regulators, said fuzzy logic regulator having a fuzzy mode selector for operator selection of a turbine warm-up profile, said fuzzy logic controller further comprising means to generate weighting signals for respective ones of said regulatory control directions by means of a fuzzy inference calculation in correspondence with selected turbine performance parameter signals and the operator-selected warm-up profile.

22. The apparatus of claim 21 wherein said fuzzy mode selector for said fuzzy logic controller comprises a slow turbine warm-up profile selection and a fast turbine warm-up profile selection.

23. The apparatus of claim 22 wherein said plurality of control loop regulators comprises a turbine temperature control loop regulator, a turbine speed control loop regulator, and a turbine rotor bore stress loop regulator.

24. The apparatus of claims 23 wherein said plurality of control loop regulators further comprises a steam system condensate level control loop regulator.

25. The apparatus of claim 24 wherein said turbine warm-up controller further is coupled to a drain valve actuator so as to drive said actuator with a weighted control signal.

26. The apparatus of claim 23 wherein said plurality of turbine performance parameter sensors comprises a turbine speed sensor, and respective temperature sensors disposed at selected locations in said turbine to allow determination of selected critical turbine temperatures.

27. The apparatus of claim 21 wherein said turbine warm-up circuit further comprises a regulator output weighting component coupled to each of said control loop regulators and to said fuzzy logic controllers so that respective weighting signals generated by said fuzzy logic controller are applied to corresponding regulatory control directions generated by said control loop regulators.

* * * * *